United States Patent [19]

Leonhart

[11] Patent Number: 5,005,048

[45] Date of Patent: Apr. 2, 1991

[54] GRAPHIC ARTS EXPOSURE DEVICE

[75] Inventor: Charles J. Leonhart, Schaumburg, Ill.

[73] Assignee: nuArc Company, Inc., Niles, Ill.

[21] Appl. No.: 548,086

[22] Filed: Jul. 5, 1990

[51] Int. Cl.⁵ ............................................. G03B 27/20
[52] U.S. Cl. ...................................... 355/93; 355/91; 355/94
[58] Field of Search ............................. 355/91, 93, 94

[56] References Cited

U.S. PATENT DOCUMENTS

| | | | |
|---|---|---|---|
| 3,198,103 | 8/1965 | Malloy et al. | 355/94 |
| 3,627,416 | 12/1971 | Benson | 355/91 |
| 4,721,383 | 1/1988 | Simon | 355/91 |

*Primary Examiner*—Monroe H. Hayes
*Attorney, Agent, or Firm*—Mason, Kolehmainen, Rathburn & Wyss

[57] ABSTRACT

A graphic arts exposure device includes a cabinet defining a work surface at a convenient working level and having a forward wall facing an operator utilizing the device. A drawer is positioned immediately below the working level movable between an extended position outwardly of the forward wall of the cabinet and a retracted position within the cabinet. A control panel for the exposure device is mounted on the drawer facing upwardly in the same general field of view for the operator as the working surface of the device. The drawer is supported on sloped slides in the cabinet below the work surface for movement between the extended and retracted positions and the slides are sloped downwardly and outwardly to automatically bias the drawer and control panel to the outwardly extended position ready for receiving operator inputs of the necessary control data while at the same time allowing the operator to view the control panel and working surface in the same general field of vision. After inputting the needed information, the drawer can be directed rearwardly by leg pressure, permitting the operator to have extended reach toward the rearward portions of the working surface without interference from an outwardly projecting control panel.

20 Claims, 5 Drawing Sheets

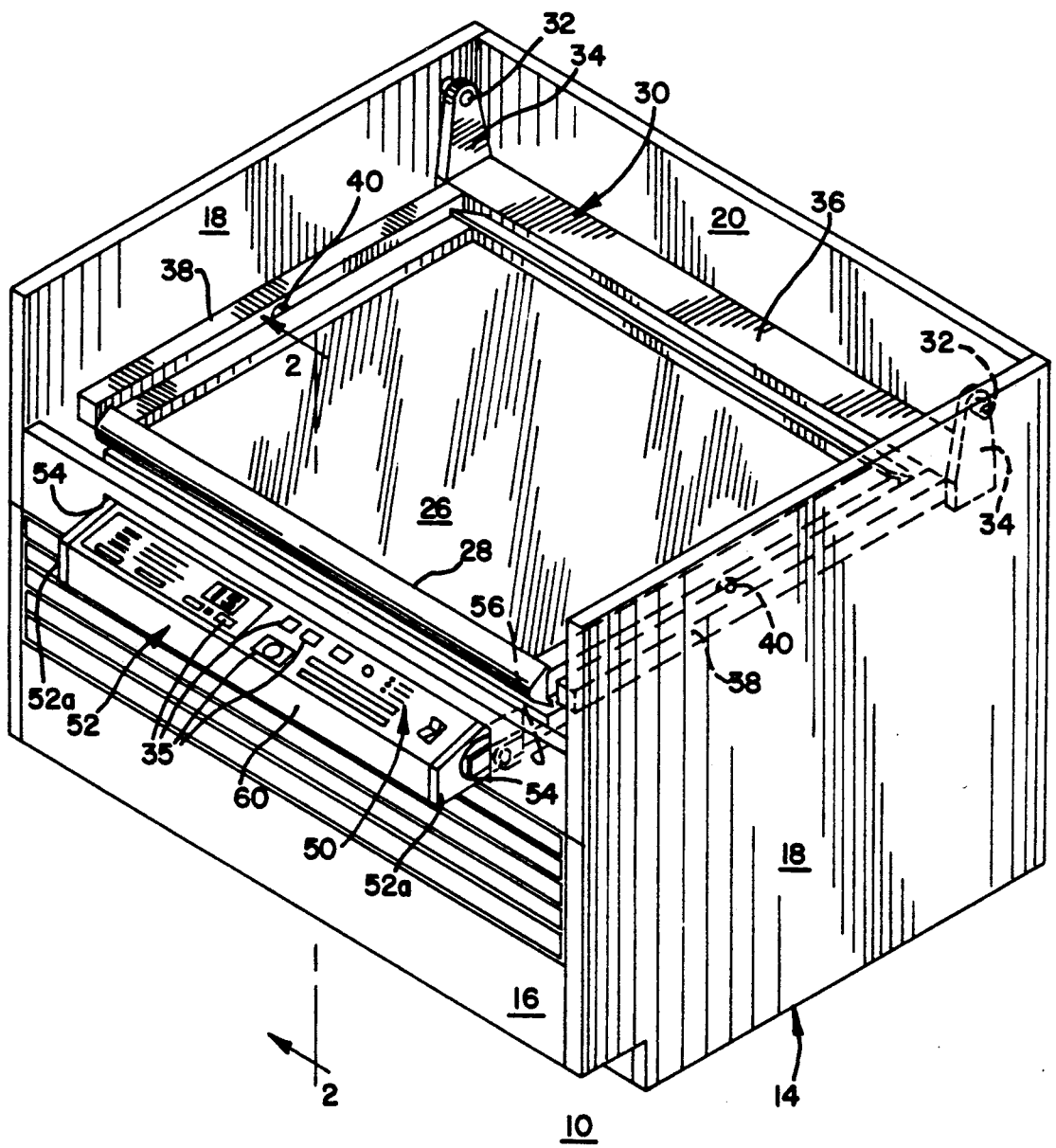

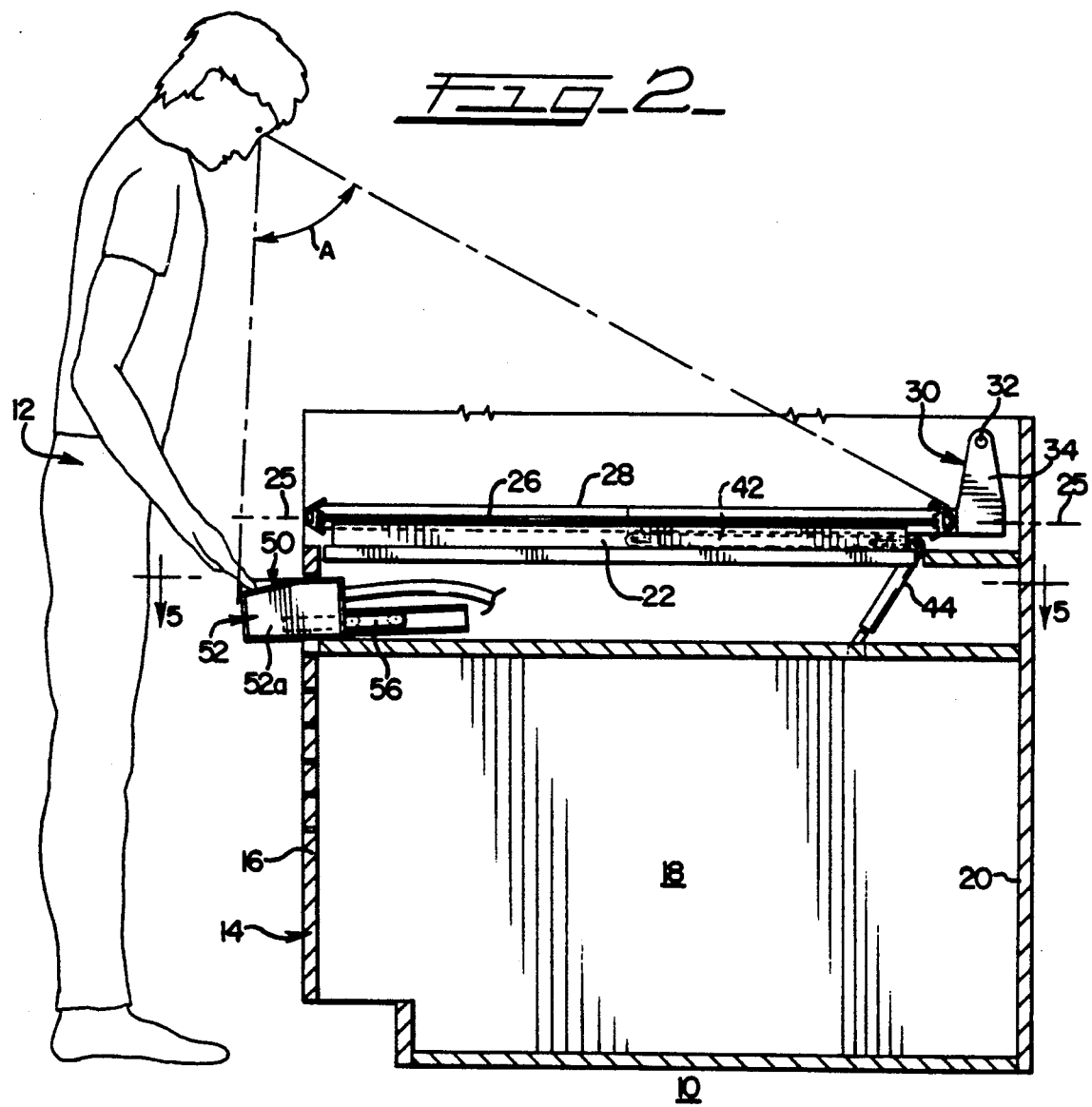

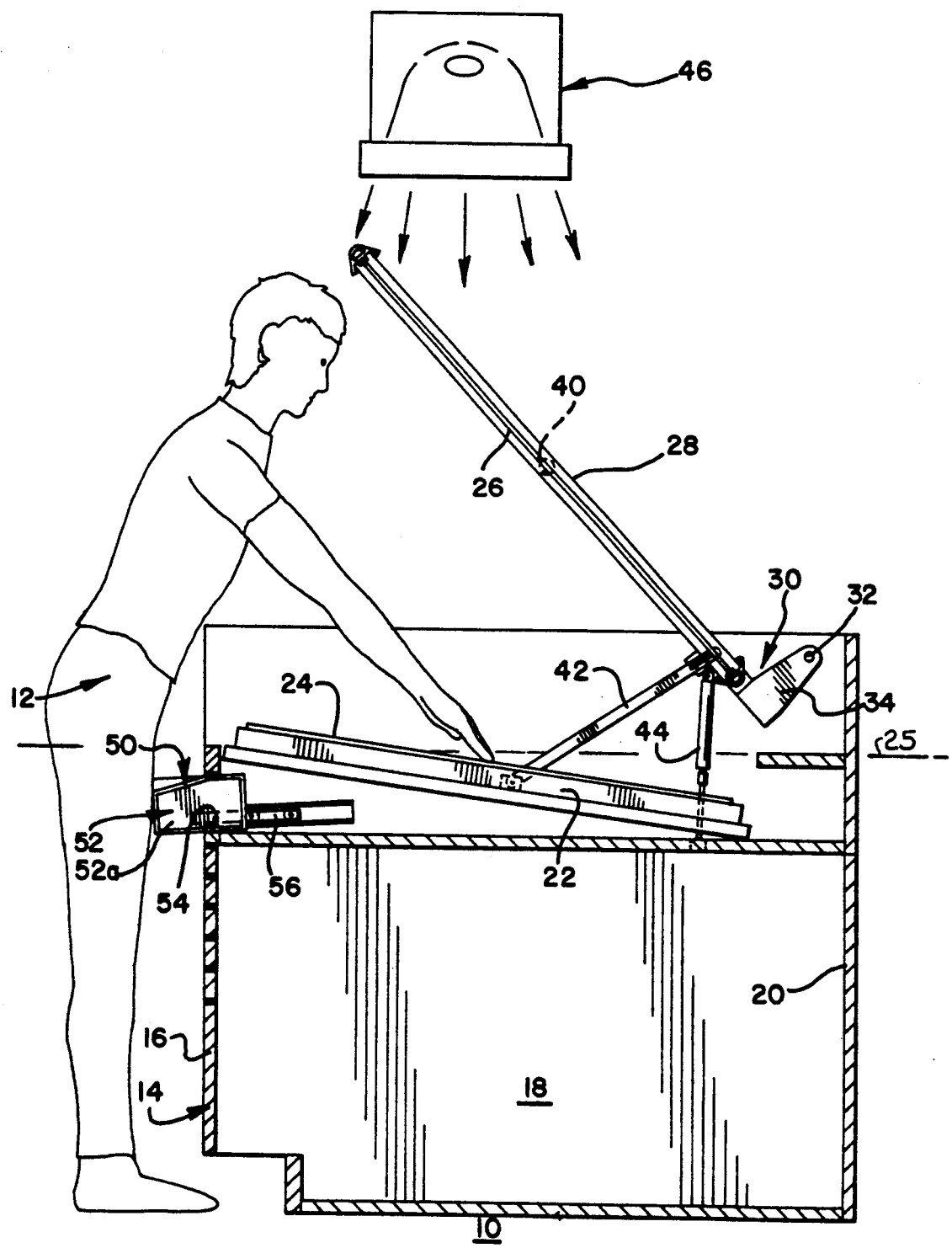
FIG_3

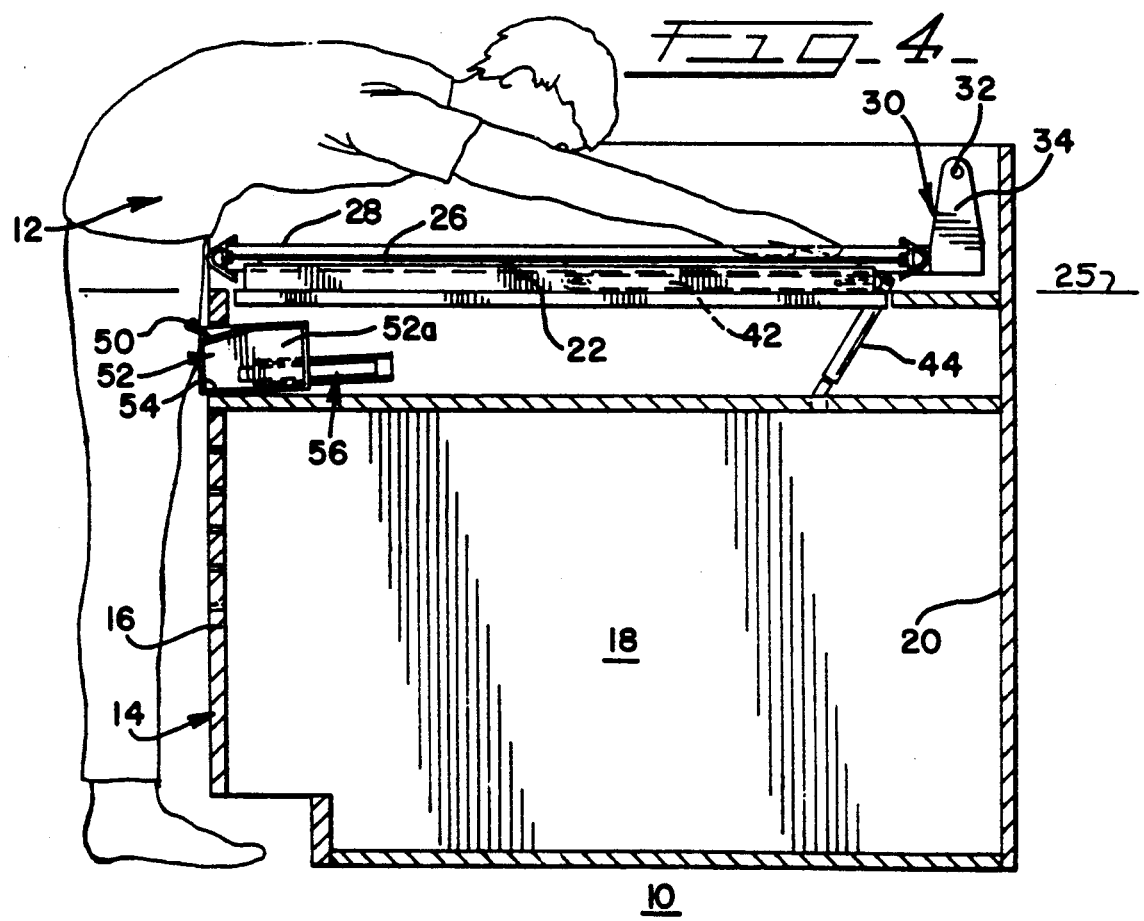

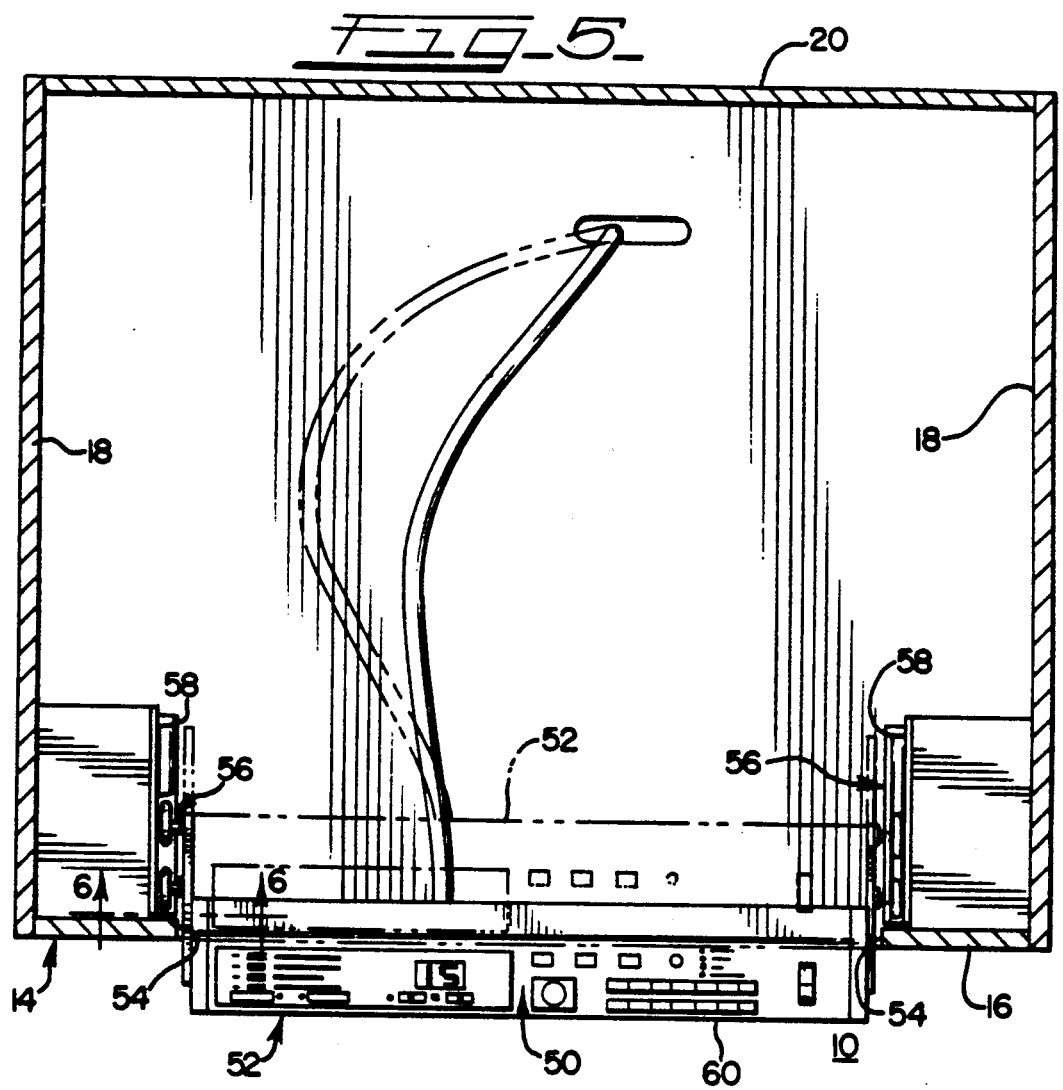
FIG_5_
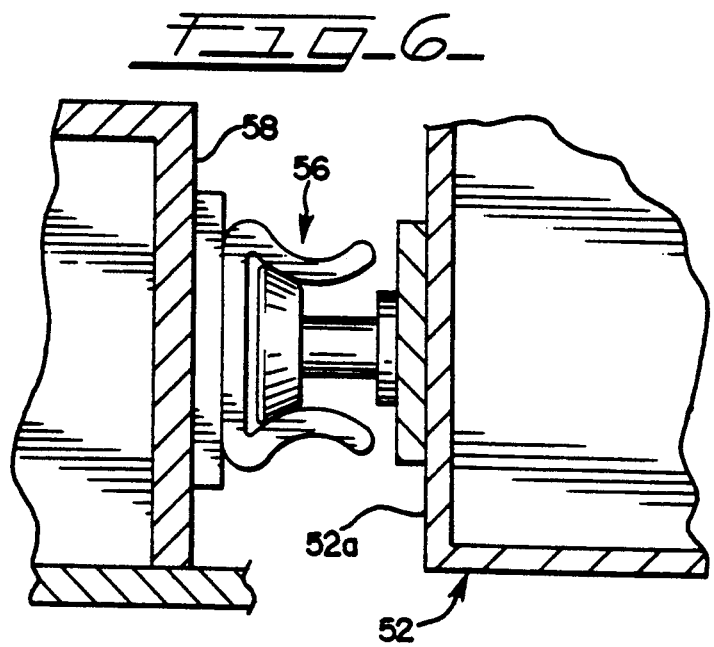
FIG_6_

GRAPHIC ARTS EXPOSURE DEVICE

BACKGROUND OF THE INVENTION

1. Field of the Invention

The present invention relates to a new and improved graphic arts exposure device or contact printer having a relatively large, flat work surface and having a control panel for the device mounted in a movable drawer and viewable by a working operator in the same general field of view as the work surface so that shifting of an operator's eyes and attention from one area to another is minimized.

2. Description of the Prior Art

U.S. Pat. No. 3,554,644 discloses a photographic printer having a horizontal work surface and a control panel spaced below the work surface and facing in a general vertical direction so that an operator is required to shift his field of vision back and forth between the control panel and the work surface during use. Moreover, the control panel projects outwardly from a front panel of the printer and thus limits an operator's rearward reach to the extent of the forward panel projection.

U.S. Pat. No. 3,627,416 discloses a twin exposing machine having a generally horizontal work surface and a frontal, forwardly projecting control panel set up. The control panel is faced to slope upwardly at an angle, but is fixed and reduces the ability of an operator standing in front of the machine to reach the rear extremities of the work surface.

U.S. Pat. No. 4,083,301 is directed towards a stencil exposure seal combination wherein a horizontal work surface is provided and an upwardly and outwardly facing control panel is attached to a forward face of the cabinet supporting the work surface.

OBJECTS OF THE INVENTION

It is an object of the present invention to provide a new and improved graphic arts exposure device having a work surface and control panel positioned generally in the same field of view of an operator so as to minimize the need for shifting the operator's attention between different areas of activity.

Another object of the present invention is to provide a new and improved graphic arts exposure device having a control panel mounted in a drawer to slide between an outwardly extended operative position and an inwardly extended or retracted position.

Yet another object of the present invention is to provide a new and improved graphic arts exposure device of the character described wherein a drawer containing a control panel is biased to move to an extended operative position and is movable to an inwardly retracted position by pressure exerted by an operator's legs or central body portion.

SUMMARY OF THE PRESENT INVENTION

The foregoing and other objects and advantages of the present invention are accomplished in a new and improved graphic arts exposure device including a cabinet supporting a work surface at a convenient working level and having a forward wall facing an operator using the device. A drawer is positioned just below the working level and is movable between an extended position, outwardly of the forward wall and retracted position partially or fully contained within the cabinet. A control panel for controlling the operation of the exposure device is mounted in the drawer and faces upwardly, generally in the same field of view as the working surface when the drawer is open in the extended position. The drawer is supported on a drawer slide provided in the cabinet below the work surface and the slide is tilted to normally bias the drawer to the outwardly extended operative position wherein the control panel is fully exposed for inputs from the operator. After control inputs are introduced, the operator can then move the drawer upwardly by leg or waist pressure and is then afforded better access to rearwardmost portions of the working surface while the drawer and control panel are in the retracted position within the cabinet. Once leg pressure is removed from the front face of the drawer, the drawer automatically slides to the outwardly extended position, exposing the control panel ready for use.

BRIEF DESCRIPTION OF THE DRAWINGS

These and other objects and advantages of the present invention will become readily apparent upon consideration of the following detailed description and attached drawing, wherein:

FIG. 1 is a front perspective view of a new and improved graphic arts exposure device constructed in accordance with the features of the present invention and illustrating a drawer and control panel supported thereby in an outwardly extended operative position;

FIG. 2 is a transverse cross-sectional view of the graphic arts exposure device taken substantially along lines 2—2 of FIG. 1, illustrating an operator's field of view while inputting control information to the control panel in an outwardly extended operative position;

FIG. 3 is a transverse cross-sectional view similar to FIG. 2, illustrating the graphic arts exposure device and an operator in position with normal reach afforded while the drawer and control panel are still in an extended position;

FIG. 4 is a transverse cross-sectional view similar to FIG. 3, illustrating the exposure control device with the drawer control panel in an inwardly retracted position for affording the operator an extended reach for working on rearward, portions of the working surface;

FIG. 5 is a horizontal cross-sectional view taken substantially along lines 5—5 of FIG. 2; and FIG. 6 is an enlarged fragmentary cross-sectional view taken substantially along lines 6—6 of FIG. 5.

DETAILED DESCRIPTION OF A PREFERRED EMBODIMENT OF THE INVENTION

Referring now more particularly to the drawings, therein is illustrated a new and improved graphic arts device 10 constructed in accordance with the features of the present invention and designed for use by an operator 12 in standing position as illustrated in FIGS. 2, 3 and 4. The graphic arts device 10 includes an upstanding cabinet 14, having a front wall 16 facing the operator 12, a pair of opposite side walls 18 and a rear wall 20 forming a rectangular housing or enclosure for supporting a generally horizontal work surface at a convenient, approximately waist-high working level above the floor as indicated by the line 25 and, including a horizontally extending vacuum blanket assembly 22 having a flexible blanket 24 on the upper face adapted to press and hold a copy sheet of light sensitive material and an image forming sheet against the underside of a rigid transparent sheet of glass or plastic 26 mounted in a rectangular glass frame 28.

Preferably, the vacuum blanket assembly 22 may be of the type shown and disclosed in copending U.S. patent application Ser. No. 07/353,055, filed May 17, 1989, incorporated herein by reference, and assigned to the same assignee as the present application. The glass frame 28 and transparent panel 26 may be of the type shown and disclosed in copending U.S. patent application Ser. No. 07/548,088, filed July 5, 1990, incorporated herein by reference and assigned to the same assignee as the present application. However, other types of vacuum blankets, glass frames and working surfaces can be utilized in accordance with the present invention.

The glass frame 28 is supported for movement between a generally horizontal, exposure position (FIGS. 2 and 4) and an upwardly tilted open position (FIG. 3) on a yoke assembly 30 of a type as disclosed in the aforementioned copending U.S. patent application. The yoke assembly 30 is supported on a pair of pivot axles 32 projecting inwardly from rearward upper portions of the opposing side walls 18 of the cabinet 14 and these pivot axles carry downwardly depending brackets 34. The brackets 34 are attached to opposite ends of a bight portion 36 of the yoke assembly 30 and a pair of side legs 38 project outwardly from opposite ends of the bight portion as shown in FIG. 1 to support the glass frame 28 on pivot axles 40 spaced midway between opposite ends of the legs.

Linkage levers 42 and gas springs 44 are provided to operationally interconnect the glass frame 28 and supporting yoke assembly 30 as is more fully described in the aforementioned copending U.S. patent application incorporated herein by reference.

As illustrated in FIG. 3, the graphic arts device 10 includes an overhead light source 46 spaced above the work surface for downwardly directing light of controlled intensity to expose light sensitive copy sheets held in position between the transparent sheet 26 on the frame 28 and the upper face of the vacuum blanket 24 when contact printing or other photographic printing processes are in progress.

In accordance with the present invention, the graphic arts exposure device 10 is provided with electrical controls for controlling the timing, operation and intensity of the light source 46 and the timing and operation of the vacuum blanket assembly 22. Input devices such as membrane switches, etc. 35 (FIG. 1) for these controls are mounted on an upwardly and forwardly sloped control panel 50 positioned just below the working level 25 of the vacuum blanket 24 and generally aligned in the direct field of view or the operator 12 as represented by the arcuate arrow "A" in FIG. 2 while the operator is in a standing position at the front of the cabinet 14.

In this position, the needed manual or finger inputs to the switches, etc. 35 on control panel 50 can be made without requiring the operator 12 to shift head or eyes back and forth to different levels or fields of view and, hence, copy operations on the device 10 can greatly be enhanced and speeded up on an upwardly facing control panel surface 50 immediately in front of a standing operator 12.

The control panel 50 provides an upper cover on a slide drawer 52 extending across the front wall 16 of the cabinet 14 at an upper level just below the level of the working surface 25 of the vacuum blanket assembly 22 and the glass frame 28. The drawer 52 is designed to house internal control components of the control system and is mounted for sliding movement in a rectangular slot 54 formed in an upper portion of the cabinet front wall 16.

The drawer is slidable between an outwardly extending operating position as shown in FIGS. 1-3 and 5 and is normally biased in this position by the force of gravity by virtue of the supporting system for the drawer 52 which comprises a pair of drawer slides 56 attached to opposite end walls 52a of the drawer 52 (FIG. 6) and facing wall segments 58 (FIGS. 5 and 6) in the upper portion of the cabinet 14.

The drawer 52 is provided with a frontal, pressure pad 60, best shown in FIG. 1, adapted for contact by an operator's legs or mid-section to move the drawer 52 inwardly or rearwardly toward the front wall 16 of cabinet 14 as shown in FIG. 4. When the drawer 52 and control panel 50 are pushed inwardly to the retracted position, the operator 12 is afforded better access and more reach toward rearward portions 25 of the working surface including the glass frame 28 and vacuum blanket 24 as shown in FIG. 4. In addition, both hands of the operator 12 are free to move about the work surface 25.

When the drawer 52 is in the rearwardly retracted position, the pressure pad 60 on the drawer 52 is flush or substantially even with the front wall 16 of the cabinet 14 and the drawer and control panel, provide no impediment or obstruction to restrict the full rearward reach of the operator 12 in dealing with copy or image sheets for precise positioning on the work surface at the rearward portions thereof as depicted in FIG. 4. As soon as operator leg or waist pressure is removed from the front pad 60 of the control panel drawer 52, the forward and downward tilt or slope of the supporting drawer slide 56 permits the weight of the drawer and contents to move freely outwardly in the cabinet 14 to the fully outward operational position as shown wherein the upwardly facing control panel 50 is fully available for receiving operator inputs to the control pads, switches, etc. 35.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A graphic arts exposure device, including:
   means defining a work surface at a convenient working level and having a forward edge facing a standing operator using the device;
   drawer means below said working level movable between an extended position outwardly of said forward edge and a retracted position;
   control panel means for controlling the operation of said device mounted with said drawer means and facing upwardly in the same field of view as said working surface; and
   drawer support means below said work surface for supporting said drawer means for movement between said extended and retracted position in a manner whereby said control panel means is normally biased to move toward said extended position and is movable by rearward pressure applied to said drawer means by said operator to move toward said retracted position.

2. The graphic arts exposure device of claim 1, wherein:
said drawer means includes a front face adapted to be contacted by said operator for moving said drawer means from said extended position to said retracted position providing extended reach for said operator toward a rearward edge portion of said work surface.

3. The graphic arts exposure device of claim 2, wherein:
said control panel means includes an upwardly facing panel segment joining an upper edge of said front face of said drawer means.

4. The graphic arts exposure device of claim 3, wherein:
said panel segment slopes upwardly and rearwardly of said upper edge of said front face of said drawer means.

5. The graphic arts exposure device of claim 2, wherein:
said front face is closely adjacent to said forward edge of said work surface when said drawer means is in said retracted position.

6. The graphic arts exposure device of claim 2, wherein:
said control panel means is forward of said forward edge of said work surface when said drawer means is in said extended position and rearwardly thereof when said drawer means is in said retracted position.

7. The graphic arts exposure device of claim 1, wherein:
said drawer support means utilizes gravitation forces for biasing said drawer means toward said extended position.

8. The graphic arts exposure device of claim 1, wherein:
said means defining said work surface comprises cabinet means having a front wall and said forward edge of said work surface is adjacent said front wall.

9. The graphic arts exposure device of claim 8, wherein:
said front wall includes slot means defined adjacent an upper portion and said drawer means is slidable through said slot means between said extended and retracted positions.

10. The graphic arts exposure device of claim 9, wherein:
said drawer means includes a front face substantially aligned with said front wall while said drawer means is in said retracted position.

11. A graphic arts exposure device, including:
cabinet means defining a work surface at a convenient working level and having a forward wall facing a standing operator using the device;
drawer means below said working level movable between an extended position outwardly of said forward wall and a retracted position in said cabinet means;
control panel means for controlling the operation of said device mounted with said drawer means and facing upwardly in the same general field of view of said operator as said working surface when said drawer means is in said extended position; and
drawer slide means in said cabinet means below said work surface for supporting said drawer means for movement between said extended and retracted position, said slide means tilted forwardly and downwardly for normally biasing said drawer means to move forwardly toward said extended position and permitting movement of said drawer means by rearwardly directed pressure applied to a forward face of said drawer means by said operator to move toward said retracted position.

12. The graphic arts exposure device of claim 11, wherein:
said front face is adapted to be contacted by said operator for moving said drawer means from said extended position to said retracted position wherein said front face is adjacent said front wall enabling said operator to reach farther toward a rearward edge portion of said work surface.

13. The graphic arts exposure device of claim 11, wherein:
said drawer slide means comprises a plurality of drawer slides on opposite ends of said drawer means and adjacent side walls of said cabinet means.

14. The graphic arts exposure device of claim 11, wherein:
said work surface is generally horizontally extending and said working level is approximately waist high with respect to said standing operator adjacent said front wall of said cabinet means.

15. The graphic arts exposure device of claim 14, wherein:
said front wall of said cabinet means includes a drawer slot at a level below said working level; and
said drawer means is movable in said slot between said extended and retracted positions.

16. The graphic arts exposure device of claim 15, wherein:
said front face of said drawer means is flush with said front wall of said cabinet means when said drawer means is in a fully retracted position in said cabinet means.

17. The graphic arts exposure device of claim 16, wherein:
said panel means slopes upwardly and rearwardly of said front face of said drawer means.

18. The graphic arts apparatus of claim 17, wherein:
said drawer slide means comprises a pair of drawer slides at opposite ends of said drawer means slidably interconnecting said ends and an adjacent portion of said cabinet means.

19. The graphic arts apparatus of claim 18, wherein:
said work surface comprises vacuum blanket means for biasing an image sheet and light sensitive copy sheet toward a transparent sheet having a planar surface.

20. The graphic arts apparatus of claim 19, wherein:
said transparent sheet is supported in glass frame means supported in said cabinet means.

* * * * *